(12) United States Patent
Lee

(10) Patent No.: US 9,946,586 B2
(45) Date of Patent: Apr. 17, 2018

(54) MEMORY SYSTEM AND OPERATING METHOD THEREOF

(71) Applicant: SK hynix Inc., Gyeonggi-do (KR)

(72) Inventor: Jun-Seo Lee, Chungcheongbuk-do (KR)

(73) Assignee: SK Hynix Inc., Gyeonggi-do (KR)

( * ) Notice: Subject to any disclaimer, the term of this patent is extended or adjusted under 35 U.S.C. 154(b) by 0 days.

(21) Appl. No.: 15/476,500

(22) Filed: Mar. 31, 2017

(65) Prior Publication Data

US 2018/0052724 A1     Feb. 22, 2018

(30) Foreign Application Priority Data

Aug. 18, 2016 (KR) .......................... 10-2016-0104908

(51) Int. Cl.
| | |
|---|---|
| *G11C 7/00* | (2006.01) |
| *G06F 11/00* | (2006.01) |
| *G06F 11/30* | (2006.01) |
| *G06F 11/34* | (2006.01) |
| *G06F 3/06* | (2006.01) |

(52) U.S. Cl.
CPC ............ *G06F 11/004* (2013.01); *G06F 3/061* (2013.01); *G06F 3/0655* (2013.01); *G06F 3/0679* (2013.01); *G06F 11/3037* (2013.01); *G06F 11/3409* (2013.01); *G06F 2201/88* (2013.01)

(58) Field of Classification Search
CPC .... G06F 11/004; G06F 3/0655; G06F 3/0679; G06F 11/3037; G06F 11/3409; G06F 2201/88
USPC ......................................................... 365/201
See application file for complete search history.

(56) References Cited

U.S. PATENT DOCUMENTS

| | | | |
|---|---|---|---|
| 2011/0182128 A1* | 7/2011 | Nobunaga | G06F 13/1694 365/189.18 |
| 2015/0103610 A1* | 4/2015 | Ellis | G11C 7/02 365/222 |
| 2015/0254003 A1 | 9/2015 | Lee et al. | |
| 2015/0255130 A1 | 9/2015 | Lee et al. | |

* cited by examiner

*Primary Examiner* — Pho M Luu
*Assistant Examiner* — Xiaochun L Chen
(74) *Attorney, Agent, or Firm* — IP & T Group LLP

(57) ABSTRACT

A memory system includes: a nonvolatile memory device; and a controller operatively coupled to the nonvolatile memory device and to a host, the controller including first and second interfaces suitable for inputting and/or outputting data from or to the host, wherein the controller is suitable for selecting any one of the first and second interfaces depending on a result of a durability check of the nonvolatile memory device.

20 Claims, 9 Drawing Sheets

MEMORY SYSTEM AND OPERATING METHOD THEREOF

CROSS-REFERENCE TO RELATED APPLICATION

This U.S. non-provisional patent application claims priority under 35 U.S.C. § 119(a) to Korean Patent Application No. 10-2016-0104908 filed on Aug. 18, 2016 in the Korean Intellectual Property Office (KIPO), the disclosure of which is incorporated herein by reference in its entirety.

TECHNICAL FIELD

Exemplary embodiments relate generally to semiconductor design technology and, more particularly, to a memory system including a nonvolatile memory device and an operating method thereof.

DISCUSSION OF THE RELATED ART

The computer environment paradigm has changed to ubiquitous computing systems that can be used anytime and anywhere. Due to this, use of portable electronic devices such as mobile phones, digital cameras, and notebook computers has rapidly increased. These portable electronic devices generally use a memory system having one or more memory devices for data storage. A memory system may be used as a main or an auxiliary memory device of a portable electronic device.

Memory systems using memory devices provide excellent stability, durability, high information access speed, and low power consumption, since they have no moving parts. Examples of memory systems having such advantages include universal serial bus (USB) memory devices, memory cards having various interfaces, and solid state drives (SSD).

SUMMARY

Various embodiments are directed to a memory system which may use a nonvolatile memory device by changing the use thereof based on a variation in durability, and an operating method thereof.

In an embodiment, a memory system may include: a nonvolatile memory device; and a controller operatively coupled to the nonvolatile memory device and to a host, the controller including first and second interfaces suitable for inputting and/or outputting data from or to the host, wherein the controller is suitable for selecting any one of the first and second interfaces depending on a result of a durability check of the nonvolatile memory device.

The controller may include: an operation selection unit suitable for performing the durability check of the nonvolatile memory device, and for selecting entry to a first or a second operation mode depending on the result of the durability check; and a switching unit suitable for inputting and/or outputting data of the nonvolatile memory device to/from the host through the first interface in the first operation mode, and inputting and/or outputting data of the nonvolatile memory device to/from the host through the second interface in the second operation mode.

The operation selection unit may count a write operation count of the nonvolatile memory device and selects entry to the first or the second operation mode, based on a predetermined count.

The operation selection unit may check a value of an error rate of data read and outputted from the nonvolatile memory device and selects entry to the first or the second operation mode, based on a predetermined value.

The operation selection unit may enter the first operation mode in the case where the durability check result is larger than a predetermined reference, and may enter the second operation mode in the case where the durability check result is smaller than the predetermined reference.

The controller may further include: a clock generation unit suitable for generating a first clock of a relatively high frequency in the first operation mode and generating a second clock of a relatively low frequency in the second operation mode.

The controller may input/output output/input data of the nonvolatile memory device to/from the host through the first interface which operates in response to the first clock in a period in which the first operation mode is entered, and may input/output output/input data of the nonvolatile memory device to/from the host through the second interface which operates in response to the second clock in a period in which the second operation mode is entered.

The controller may use the nonvolatile memory device as a main memory device of the host, in the first operation mode. The controller may use the nonvolatile memory device as a storage of the host, in the second operation mode.

The first interface may be a dual in-line memory module (DIMM) interface. The second interface may be a PCI-express (peripheral component interconnect express: PCI-e) interface.

The nonvolatile memory device may be at least one of a flash memory, a phase-change random access memory (PCRAM), a resistive random access memory (RRAM), a ferroelectric random access memory (FRAM), a magnetoresistive RAM (MRAM) and a spin transfer torque random access memory (STT-RAM).

In an embodiment, a method for operating a memory system comprising a nonvolatile memory device coupled first and second interfaces suitable for inputting and/or outputting data from or to a host, the method may include: performing a durability check of the nonvolatile memory device; and inputting and/or outputting data of the nonvolatile memory device to/from the host by selecting one of the first and second interfaces depending on a result of the durability check.

The durability check may include: measuring durability of the nonvolatile memory device, and selecting entry to a first or a second operation mode depending on the measurement result. The inputting and/or outputting may include: Inputting and/or outputting data of the nonvolatile memory device to/from the host through the first Interface in the first operation mode; and inputting and/or outputting data of the nonvolatile memory device to/from the host through the second interface in the second operation mode.

The durability check may include counting a write operation count of the nonvolatile memory device and selecting entry to the first or the second operation mode based on a predetermined count.

The durability check may include checking a value of an error rate of data read and outputted from the nonvolatile memory device and selecting entry to the first or the second operation mode based on a predetermined value.

The durability check may include: entering the first operation mode in the case where the durability check result is larger than a predetermined reference; and entering the second operation mode in the case where the durability check result is smaller than the predetermined reference.

The method may further include: generating a first clock of a relatively high frequency in the first operation mode, and generating a second clock of a relatively low frequency in the second operation mode.

The inputting and/or outputting may include: inputting and/or outputting data of the nonvolatile memory device to/from the host through the first interface which operates in response to the first clock in a period in which the first operation mode is entered; and inputting and/or outputting data of the nonvolatile memory device to/from the host through the second interface which operates in response to the second clock in a period in which the second operation mode is entered.

The nonvolatile memory device may be used as a main memory device of the host, in the first operation mode. The nonvolatile memory device may be used as a storage of the host, in the second operation mode.

The first interface may be a dual in-line memory module (DIMM) interface. The second interface may be a PCI-express (peripheral component interconnect express: PCI-e) interface.

The nonvolatile memory device may be at least one of a flash memory, a phase-change random access memory (PCRAM), a resistive random access memory (RRAM), a ferroelectric random access memory (FRAM), a magnetoresistive RAM (MRAM) and a spin transfer torque random access memory (STT-RAM).

BRIEF DESCRIPTION OF THE DRAWINGS

These and other features and advantages of the present inventive concept will become apparent to those skilled in the relevant art from the following detailed description in reference to the accompanying drawings, wherein.

DETAILED DESCRIPTION

Figure 1:
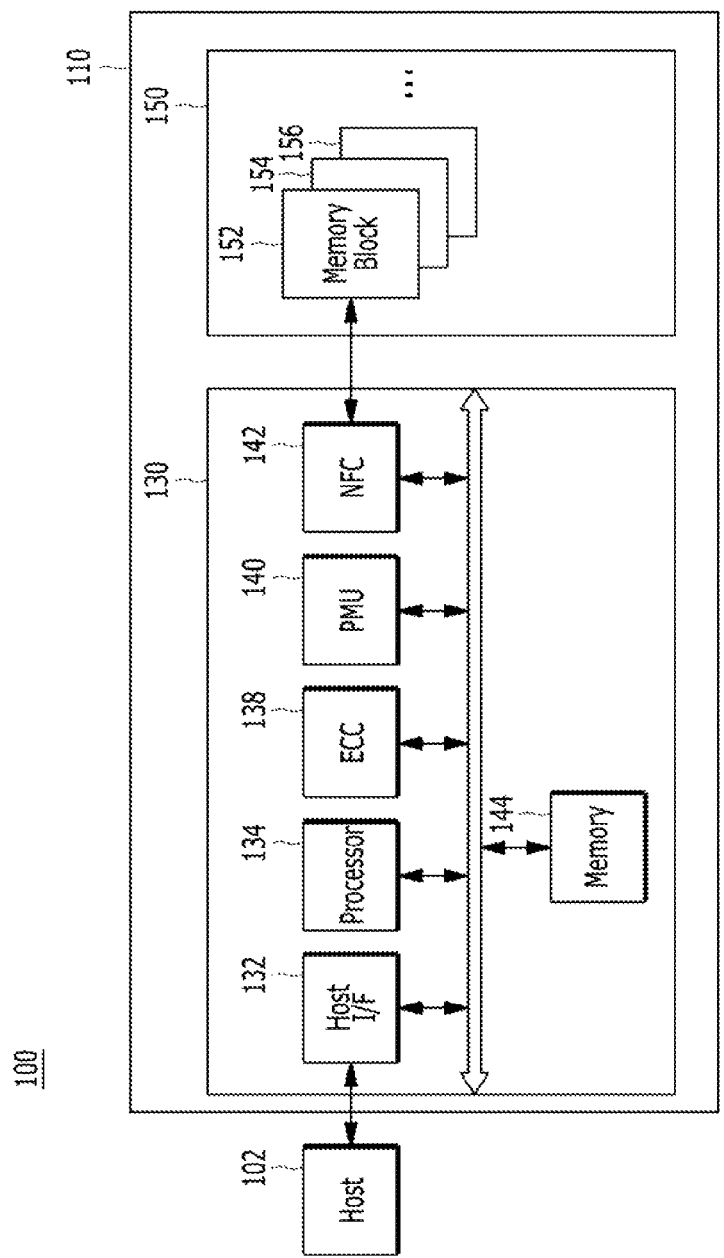
FIG. 1 is a diagram illustrating a data processing system including a memory system, according to an exemplary embodiment of the present invention.

Various embodiments will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

Although, various embodiments are described below in more detail with reference to the accompanying drawings, we note that the present invention may, however, be embodied in different forms and should not be construed as being limited to the embodiments set forth herein. Rather, the described embodiments are provided so that this disclosure will be thorough and complete, and will fully convey the present invention to those skilled in the art to which this invention pertains. Throughout the disclosure, like reference numerals refer to like parts throughout the various figures and embodiments of the present invention.

It will be understood that, although the terms "first", "second", "third", and so on may be used herein to describe various elements, these elements are not limited by these terms. These terms are used to distinguish one element from another element. Thus, a first element described below could also be termed as a second or third element without departing from the spirit and scope of the present invention.

The drawings are not necessarily to scale and, in some instances, proportions may have been exaggerated in order to clearly illustrate features of the embodiments.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The terminology used herein is for the purpose of describing particular embodiments only and is not Intended to be limiting of the present invention. As used herein, singular forms are intended to include the plural forms as well, unless the context clearly indicates otherwise. It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention belongs in view of the present disclosure. It will be further understood that terms, such as those defined in commonly used dictionaries, should be interpreted as having a meaning that is consistent with their meaning in the context of the present disclosure and the relevant art and will not be interpreted in an idealized or overly formal sense unless expressly so defined herein.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, a feature or element described in connection with one embodiment may be used singly or in combination with other features or elements of another embodiment, unless otherwise specifically indicated.

Hereinafter, the various embodiments of the present invention will be described in detail with reference to the attached drawings.

FIG. 1 illustrates a data processing system 100 including a memory system 110, according to an exemplary embodiment of the present invention.

Referring to FIG. 1, the data processing system 100 may include a host 102 and a memory system 110.

The host 102 may include, for example, a portable electronic device such as a mobile phone, an MP3 player and a laptop computer or an electronic device such as a desktop computer, a game player, a television (TV) and a projector.

The memory system 110 may operate in response to a request from the host 102. For example, the memory system 110 may store data to be accessed by the host 102. The memory system 110 may be used as a main memory or an auxiliary memory of the host 102. The memory system 110 may be implemented with any one of various storage devices, according to the protocol of a host interface to be coupled electrically with the host 102. The memory system 110 may be implemented with any one of various storage devices, such as, a solid state drive (SSD), a multimedia card (MMC), an embedded MMC (eMMC), a reduced size MMC (RS-MMC), a micro-MMC, a secure digital (SD) card, a mini-SD, a micro-SD, a universal serial bus (USB) storage device, a universal flash storage (UFS) device, a compact flash (CF) card, a smart media (SM) card, a memory stick, and the like.

The storage devices forming the memory system 110 may be implemented with a volatile memory device, such as, a dynamic random access memory (DRAM) and a static random access memory (SRAM) or a nonvolatile memory device such as a read only memory (ROM), a mask ROM (MROM), a programmable ROM (PROM), an erasable programmable ROM (EPROM), an electrically erasable programmable ROM (EEPROM), a ferroelectric random access memory (FRAM), a phase-change RAM (PRAM), a magnetoresistive RAM (MRAM), a spin transfer torque random access memory (STT-RAM), a resistive RAM (RRAM) and a flash memory.

The memory system 110 may include a memory device 150 and a controller 130. The memory device 150 may store data to be accessed by the host 102, and the controller 130 may control data exchange between the memory device 150 and the host 102. Under the control of the controller 130, data received from the host 102 may be stored in the memory device 150.

The controller 130 and the memory device 150 may be integrated into one semiconductor device. For instance, the controller 130 and the memory device 150 may be integrated into one semiconductor device to form a solid-state drive (SSD). When the memory system 110 is used as the SSD, the operation speed of the host 102 that is electrically coupled with the memory system 110 may be significantly increased.

The controller 130 and the memory device 150 may be integrated into one semiconductor device to form a memory card, such as, a Personal Computer Memory Card International Association (PCMCIA) card, a compact flash (CF) card, a smart media card (SMC), a memory stick, a multimedia card (MMC), an RS-MMC, a micro-MMC, a secure digital (SD) card, a mini-SD, a micro-SD, an SDHC, and a universal flash storage (UFS) device.

For Instance, the memory system 110 may configure a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation device, a black box, a digital camera, a digital multimedia broadcasting (DMB) player, a three-dimensional (3D) television, a smart television, a digital audio recorder, a digital audio player, a digital picture recorder, a digital picture player, a digital video recorder, a digital video player, a storage for a data center, a device capable of transmitting and receiving information under a wireless environment, one of various electronic devices for a home network, one of various electronic devices for a computer network, one of various electronic devices for a telematics network, an RFID device, or one of various component elements for a computing system.

The memory device 150 may retain stored data even when power is blocked, store the data provided from the host 102 during a write operation, and provide stored data to the host 102 during a read operation. The memory device 150 may include a plurality of memory blocks 152, 154 and 156. Each of the memory blocks 152, 154 and 156 may include a plurality of pages. Each of the pages may include a plurality of memory cells to which a plurality of a word line (WL) are electrically coupled. The memory cells may be single bit cells or multi-bit cells. The memory cells may be arranged in a two or three-dimensional stacked structure. The memory device 150 may be a nonvolatile memory device, for example, a flash memory. The flash memory may have a three-dimensional (3D) stack structure. The structure of the memory device 150 and the three-dimensional (3D) stack structure of the memory device 150 will be described later in detail with reference to FIGS. 2 to 4.

The controller 130 of the memory system 110 may control the memory device 150 in response to a request from the host 102. The controller 130 may provide the data read from the memory device 150, to the host 102, and store the data provided from the host 102 into the memory device 150. To this end, the controller 130 may control overall operations of the memory device 150, such as read, write, program, and erase operations.

For example, the controller 130 may include a host interface (I/F) unit 132, a processor 134, an error correction code (ECC) unit 138, a power management unit (PMU) 140, a NAND flash controller (NFC) 142, and a memory 144.

The host interface unit 132 may process commands and data provided from the host 102, and may communicate with the host 102 through at least one of various interface protocols such as universal serial bus (USB), multimedia card (MMC), peripheral component interconnect-express (PCI-E), serial attached SCSI (SAS), serial advanced technology attachment (SATA), parallel advanced technology attachment (PATA), small computer system interface (SCSI), enhanced small disk interface (ESDI), and integrated drive electronics (IDE).

The ECC unit 138 may detect and correct errors in the data read from the memory device 150 during the read operation. The ECC unit 138 may not correct error bits when the number of the error bits is greater than or equal to a threshold number of correctable error bits, and may output an error correction fail signal indicating failure in correcting the error bits.

The ECC unit 138 may perform an error correction operation based on a coded modulation such as a low-density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), and so on. The ECC unit 138 may include all circuits, systems or devices for the error correction operation.

The PMU 140 may provide and manage power for the controller 130, that is, power for the component elements included in the controller 130.

The NFC 142 may serve as a memory interface between the controller 130 and the memory device 150 to allow the controller 130 to control the memory device 150 in response to a request from the host 102. The NFC 142 may generate control signals for the memory device 150 and process data under the control of the processor 134 when the memory device 150 is a flash memory and, in particular, when the memory device 150 is a NAND flash memory.

The memory 144 may serve as a working memory of the memory system 110 and the controller 130, and store data for driving the memory system 110 and the controller 130. The controller 130 may control the memory device 150 in response to a request from the host 102. For example, the controller 130 may provide the data read from the memory device 150 to the host 102 and store the data provided from the host 102 in the memory device 150. When the controller 130 controls the operations of the memory device 150, the memory 144 may store data used by the controller 130 and the memory device 150 for such operations as read, write, program and erase operations.

The memory 144 may be implemented with volatile memory such as a static random access memory (SRAM) or a dynamic random access memory (DRAM). As described above, the memory 144 may store data used by the host 102 and the memory device 150 for the read and write operations. For such storage of the data, the memory 144 may include a program memory, a data memory, a write buffer, a read buffer, a map buffer, and so forth.

The processor 134 may control general operations of the memory system 110, and a write operation or a read operation for the memory device 150, in response to a write request or a read request from the host 102. The processor 134 may drive firmware, which is referred to as a flash translation layer (FTL), to control the general operations of the memory system 110. The processor 134 may be implemented with a microprocessor or a central processing unit (CPU).

A management unit (not shown) may be included in the processor 134, and may perform bad block management of the memory device 150. The management unit may find bad memory blocks included in the memory device 150, which are in unsatisfactory condition for further use, and perform bad block management on the bad memory blocks. When the memory device 150 is a flash memory, for example, a NAND flash memory, a program failure may occur during the write operation, for example, during the program operation, due to characteristics of a NAND logic function. During the bad block management, the data of the program-failed memory block or the bad memory block may be programmed into a new memory block. Also, the bad blocks due to the program fail seriously deteriorate the utilization efficiency of the memory device 150 having a 3D stack structure and the reliability of the memory system 100, and thus reliable bad block management is required.

Figure 2:
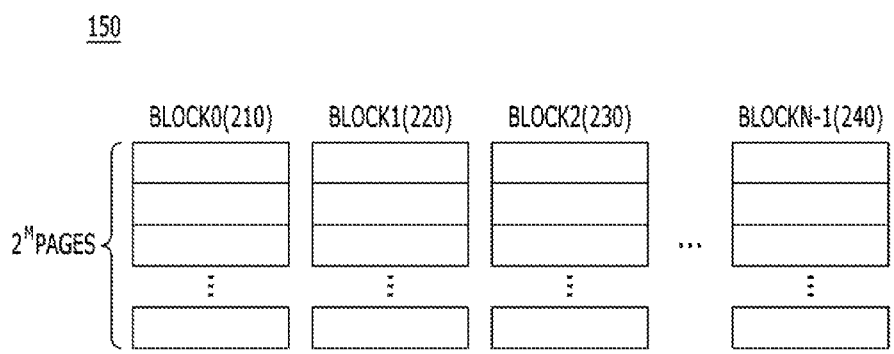
FIG. 2 is a diagram illustrating an example of a memory device employed in the memory system of FIG. 1.

FIG. 2 is a diagram of the memory device 150 shown in FIG. 1.

Referring to FIG. 2, the memory device 150 may include a plurality of memory blocks, for example, a zeroth memory block (BLOCK0) 210, a first memory block (BLOCK1) 220, a second memory block (BLOCK2) 230 and an N−1th memory block (BLOCKN−1) 240. Each of the memory blocks 210 to 240 may include a plurality of pages, for example, $2^M$ number of pages ($2^M$ PAGES). Each of the pages may include a plurality of memory cells to which a plurality of word lines are electrically coupled.

Also, the memory device 150 may include a plurality of memory blocks, as single level cell (SLC) memory blocks and multi-level cell (MLC) memory blocks, according to the number of bits which may be stored or expressed in each memory cell. The SLC memory block may include a plurality of pages which are implemented with memory cells each capable of storing 1-bit data. The MLC memory block may include a plurality of pages which are implemented with memory cells each capable of storing multi-bit data, for example, two or more-bit data. The MLC memory block including a plurality of pages which are implemented with memory cells that are each capable of storing 3-bit data may be defined as a triple level cell (TLC) memory block.

Each of the memory blocks 210 to 240 may store the data provided from the host 102 during a write operation, and provide the stored data to the host 102 during a read operation.

Figure 3:
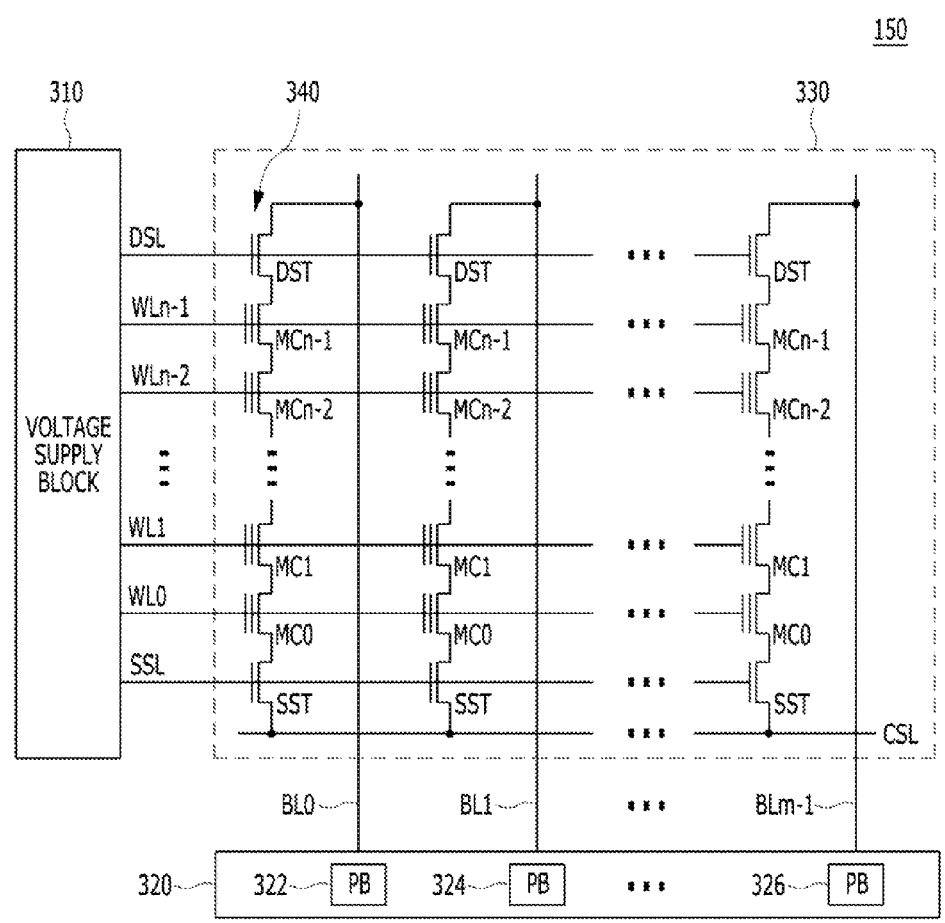
FIG. 3 is a circuit diagram illustrating a memory block in a memory device, according to an exemplary embodiment of the present invention.

FIG. 3 is a diagram illustrating a memory device 150 including the memory block shown in FIG. 2. FIG. 3 shows a configuration of a single memory block 330 and circuits related thereto 310 and 320.

Referring to FIG. 3, the memory block 330 may include a plurality of cell strings 340 which are electrically coupled to bit lines BL0 to BLm−1, respectively. The cell string 340 of each column may include at least one drain select transistor (i.e., string select transistor) DST and at least one source select transistor (i.e., ground select transistor) SST. A plurality of memory cell transistors MC0 to MCn−1 may be electrically coupled in series between the select transistors SST and DST. The respective memory cells MC0 to MCn−1 may be configured by multi-level cells (MLC) each of which stores data information of a plurality of bits. The cell strings 340 may be electrically coupled to the corresponding bit lines BL0 to BLm−1, respectively. For reference, in FIG. 3, 'DSL' may denote a string select line (i.e., a drain select line), 'SSL' may denote a ground select line (i.e., a source select line), and 'CSL' may denote a common source line.

While FIG. 3 shows, as an example, the memory block 330 which is configured by NAND flash memory cells, it is to be noted that the memory block 330 of the memory device 150 according to an exemplary embodiment of the present invention is not limited to NAND flash memory and may be realized by NOR flash memory, hybrid flash memory in which at least two kinds of memory cells are combined, or one-NAND flash memory in which a controller is built in a memory chip. The operational characteristics of a semiconductor device may be applied to not only a flash memory device in which a charge storing layer is configured by conductive floating gates but also a charge trap flash (CTF) in which a charge storing layer is configured by a dielectric layer.

A voltage supply block 310 of the memory device 150 may provide word line voltages, for example, a program voltage, a read voltage and a pass voltage, to be supplied to respective word lines according to an operation mode and voltages to be supplied to bulks, for example, well regions, where the memory cells are formed. The voltage supply block 310 may perform a voltage generating operation under the control of a control circuit (not shown). The voltage supply block 310 may generate a plurality of variable read voltages to generate a plurality of read data, select one of the memory blocks or sectors of a memory cell array under the control of the control circuit, select one of the word lines of the selected memory block, and provide the word line voltages to the selected word line and unselected word lines.

A read/write circuit 320 of the memory device 150 may be controlled by the control circuit, and may serve as a sense amplifier or a write driver according to an operation mode. During a verification/normal read operation, the read/write circuit 320 may serve as a sense amplifier for reading data from the memory cell array. Also, during a program operation, the read/write circuit 320 may serve as a write driver which drives bit lines according to data to be stored in the memory cell array. The read/write circuit 320 may receive data to be written in the memory cell array, from a buffer (not shown), during the program operation, and may drive the bit lines according to the inputted data. To this end, the read/write circuit 320 may include a plurality of page buffers (PBs) 322, 324 and 326 respectively corresponding to columns (or bit lines) or pairs of columns (or pairs of bit lines), and a plurality of latches (not shown) may be included in each of the page buffers (PBs) 322, 324 and 326.

The memory device 150 may be realized as a 2-dimensional or 3-dimensional memory device. For example, as shown in FIG. 4, in the case where the memory device 150 is realized as a 3-dimensional nonvolatile memory device, the memory device 150 may include a plurality of memory blocks BLK0 to BLKN−1.

Figure 4:
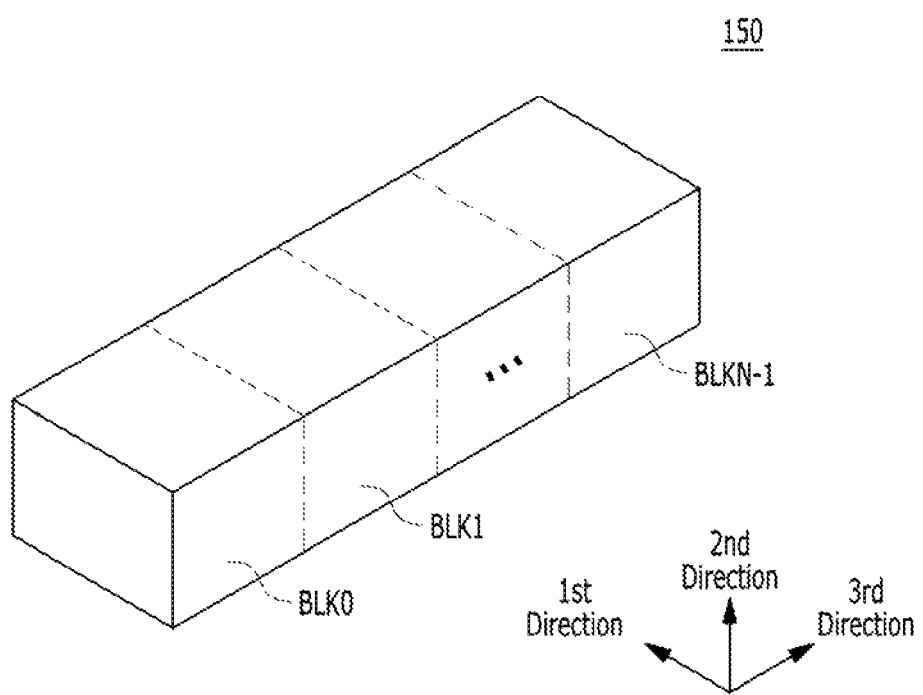
FIG. 4 is a diagram illustrating an example configuration of a memory device, according to an exemplary embodiment of the present invention.

FIG. 4 is a diagram illustrating the memory blocks of the memory device 150 shown in FIG. 3, and the memory blocks BLK0 to BLKN−1 may be realized as a 3-dimensional structure (or a vertical structure). For example, the respective memory blocks BLK0 to BLKN−1 may be realized as a 3-dimensional structure by including a structure which extends in first to third directions (for example, the x-axis direction, the y-axis direction and the z-axis direction).

The respective memory blocks BLK0 to BLKN−1 may include a plurality of NAND strings extending in the second direction. The plurality of NAND strings may be provided in the first direction and the third direction. Each NAND string may be electrically coupled to a bit line, at least one drain select line, at least one ground select line, a plurality of word lines, at least one dummy word line, and a common source line. Namely, the respective memory blocks BLK0 to BLKN−1 may be electrically coupled to a plurality of bit lines, a plurality of drain select lines, a plurality of ground select lines, a plurality of word lines, a plurality of dummy word lines, and a plurality of common source lines.

Figure 5:
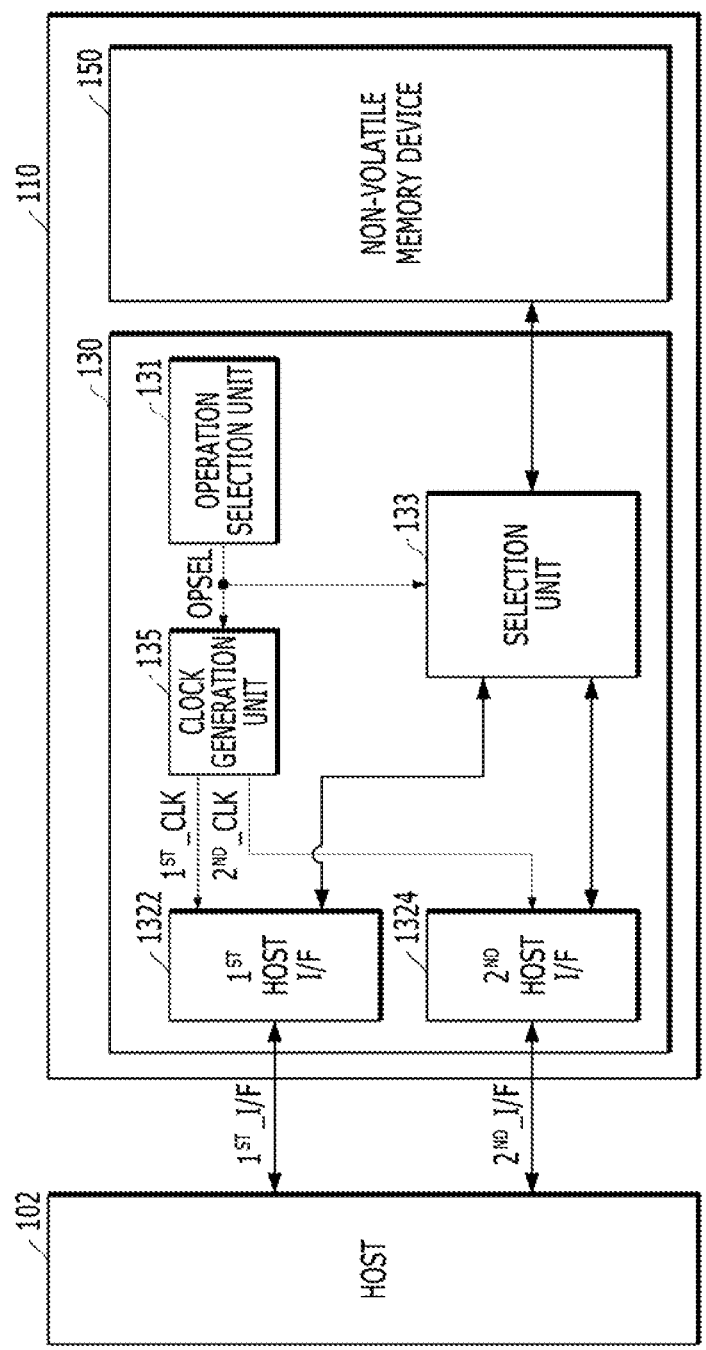
FIG. 5 is a block diagram illustrating a semiconductor system including characterizing features in accordance with an exemplary embodiment, by referring to the memory system in accordance with the embodiment illustrated in FIG. 1.

FIG. 5 is a block diagram illustrating a semiconductor system including characterizing features in accordance with an embodiment, by referring to the memory system in accordance with the embodiment illustrated in FIG. 1.

Referring to FIG. 5, it may be seen that there is illustrated the configuration of a memory system 110 which includes a nonvolatile memory device 150, by referring to the configuration of the memory system 110 illustrated in FIG. 1. For reference, while a configuration in which one nonvolatile memory device 150 is included in the memory system 110 is illustrated in the drawing, this is nothing but a mere example, and it is to be noted that two or more nonvolatile memory devices may be included actually in the memory system 110.

Further, it may be seen that components 1322, 1324, 131, 133 and 135 included in a controller 130 illustrated in FIG. 5 are substantially different from the components 132, 134, 138, 140 and 142 included in the controller 130 illustrated in FIG. 1. This is because the components 1322, 1324, 131, 133 and 135 included in the controller 130 illustrated in FIG. 5 are provided by newly defining, based on functional operations, the components 132, 134, 138, 140 and 142 included in the controller 130 illustrated in FIG. 1, which are separated from one another based on physical shapes thereof. That is to say, merely, the components 132, 134, 138, 140 and 142 of physical shapes as included in the controller 130 illustrated in FIG. 1 are not illustrated to be included in the controller 130 illustrated in FIG. 5, and the controller 130 illustrated in FIG. 5 may have an actual physical shape in which all the components 132, 134, 138, 140 and 142 included in the controller 130 illustrated in FIG. 1 are included.

Actually, a difference in physical components between the controller 130 illustrated in FIG. 1 and the controller 130 illustrated in FIG. 5 resides only in that the controller 130 illustrated in FIG. 1 includes therein one host interface unit 132 because it is assumed that the controller 130 is coupled with the host 102 through one interface and the controller 130 illustrated in FIG. 5 includes therein two host interface control units 1322 and 1324 because it is assumed that the controller 130 is coupled with a host 102 through two interfaces.

Summarizing these, when compared to the memory system 110 illustrated in FIG. 1, it may be seen that the memory system 110 illustrated in FIG. 5, including characterizing features of the present embodiment, is coupled with the host 102 through the two different interface control units 1322 and 1324.

The memory system 110 illustrated in FIG. 5 may include a nonvolatile memory device 150 and the controller 130.

The nonvolatile memory device 150 may be any one memory among a flash memory, a phase-change random access memory (PCRAM), a resistive random access memory (RRAM), a ferroelectric random access memory (FRAM), a magnetoresistive RAM (MRAM) and a spin transfer torque random access memory (STT-RAM). However, it is to be noted that the present embodiment of the disclosure is not limited thereto, and descriptions will be made below on the assumption that the nonvolatile memory device 150 is a phase-change random access memory (PCRAM).

The controller 130 may include a first interface 1ST_I/F and a second interface 2ND_I/F for inputting and/or outputting data with respect to the host 102. The controller 130 inputs/outputs data to be outputted/inputted from/to the nonvolatile memory device 150, to/from the host 102, by selecting of the first interface 1ST_I/F and the second interface 2ND_I/F depending on a result of checking the durability of the nonvolatile memory device 150.

The controller 130 may include a first interface control unit 1322, a second interface control unit 1324, an operation selection unit 131, a switching unit 133, and a clock generation unit 135.

The operation selection unit 131 may measure the durability of the nonvolatile memory device 150, and select entry to any one operation mode between a first operation mode and a second operation mode, depending on a measurement result. The operation selection unit 131 may measure the durability of the nonvolatile memory device 150, and select whether to cause the controller 130 to operate in the first operation mode or the second operation mode, depending on a measurement result.

A method of measuring the durability of the nonvolatile memory device 150 may be performed by the operation selection unit 131. The method may include a first and a second method as described below.

The first method may include counting the write operation count of the nonvolatile memory device 150, comparing the write operation count to a predetermined count for the non-volatile memory device, and selecting entry to the first or the second operation mode based on whether or not the write operation count has reached or exceeded the predetermined count.

Detailed descriptions will now be made for the first method.

First, it is noted that a typical operation that decreases the durability (or lifetime) of the nonvolatile memory device 150, among operations for the nonvolatile memory device 150, is a write/erase operation. Thus, the write operation count provides a first measure of the durability of the nonvolatile memory device. Hence, by counting the write operations performed in the nonvolatile memory device 150, the method provides a first measure of the durability (or lifetime) of the nonvolatile memory device 150 and how much it has decreased. Therefore, the operation selection unit 131 may increase the count of the write operations each time a write operation is performed in the nonvolatile memory device 150 and may then compare the count of the performed write operations with a predetermined count for the nonvolatile memory device. In an embodiment, the operation selection unit 131 may check whether a count exceeds the predetermined count. In the case where the count does not exceed the predetermined count, it may then be determined that the remaining durability of the nonvolatile memory device 150 is larger than a predetermined reference. Conversely, in the case where the count exceeds the predetermined count, it may then be determined that the durability of the nonvolatile memory device 150 is smaller than the predetermined reference. The predetermined count and the predetermined reference corresponding thereto may be changed variously depending on the kind and state of a nonvolatile memory device and a designer's setting method.

The second method may check the value of the error rate of the data read and outputted from the nonvolatile memory device 150 and may select entry to the first or the second operation mode, based on a predetermined value.

Detailed descriptions will now be made for the second method.

The controller 130 may employ a method of detecting and correcting an error included in the data read from the nonvolatile memory device 150, by using a component such as the ECC unit 138 shown in FIG. 1. In this regard, a limit may exist in the number of error bits that are capable of being corrected by the ECC unit 138, for the data read from the nonvolatile memory device 150, and the value of the limit may be determined through the operation of the ECC unit 138 based on the durability (or expected lifetime) of the nonvolatile memory device 150 predicted through a test.

Therefore, by checking whether the value of the error rate of the data read from the nonvolatile memory device 150 exceeds the predetermined value or not, that is, by checking whether the number of error bits occurred in the data read from the nonvolatile memory device 150 exceeds a predetermined number of bits or not, it is possible to be substantially aware of how much the durability (or lifetime) of the nonvolatile memory device 150 has decreased. Hence, in the second method, the operation selection unit 131 employs the way of checking whether the number of occurred error bits exceeds the predetermined number or not, when an error bit occurs in the data read from the nonvolatile memory device 150. In the case where the number of error bits does not exceed the predetermined number, it may be decided that the durability of the nonvolatile memory device 150 is larger than a predetermined reference. Conversely, in the case where the number of error bits exceeds the predetermined number, it may be seen that the durability of the nonvolatile memory device 150 is smaller than the predetermined reference. For reference, the predetermined number and the predetermined reference corresponding thereto may be set as values smaller than the limit in the number of error bits capable of being corrected by the ECC unit 138, by a special function register (SFR), and may be changed variously depending on the kind and state of a nonvolatile memory device and a designer's setting method.

The durability of the nonvolatile memory device 150 may be measured through the operation of the operation selection unit 131 as described above, and, depending on a measurement result, the operation selection unit 131 may select whether the controller 130 will operate in the first operation mode or the second operation mode.

For example, as a result of measuring the durability of the nonvolatile memory device 150 by the operation selection unit 131, in the case where the durability of the nonvolatile memory device 150 is larger than and/or equal to the predetermined reference, the controller 130 may be selected to operate in the first operation mode, and, in the case where the durability of the nonvolatile memory device 150 is smaller than the predetermined reference, the controller 130 may be selected to operate in the second operation mode.

In the case where the controller 130 operates in the first operation mode by the operation selection unit 131, in order to allow data to be outputted/inputted from/to the nonvolatile memory device 150, to be outputted/inputted through the first interface 1ST_I/F, the switching unit 133 transfers the data to be outputted/inputted from/to the nonvolatile memory device 150, through the first interface control unit 1322. Also, in the case where the controller 130 operates in the second operation mode by the operation selection unit 131, in order to allow data to be outputted/inputted from/to the nonvolatile memory device 150, to be outputted/inputted through the second Interface 2ND_I/F, the switching unit 133 transfers the data to be outputted/inputted from/to the nonvolatile memory device 150, through the second interface control unit 1324.

The clock generation unit 135 may generate a first clock 1ST_CLK which has a relatively high frequency, in the case where the controller 130 operates in the first operation mode by the operation selection unit 131, and generate a second clock 2ND_CLK which has a relatively low frequency, in the case where the controller 130 operates in the second operation mode by the operation selection unit 131. That is to say, the frequency of the first clock 1ST_CLK which is generated in the first operation mode may be caused to be higher than the frequency of the second clock 2ND_CLK which is generated in the second operation mode.

In this way, when the controller 130 operates in the first operation mode, the first clock 1ST_CLK which is generated by the clock generation unit 135 and has a relatively high frequency may be transferred to the first interface control unit 1322. As a consequence, it is possible to accelerate relatively a speed at which data to be outputted/inputted from/to the nonvolatile memory device 150 and be transferred through the first Interface control unit 1322 by the operation of the switching unit 133 are inputted/outputted to/from the host 102 through the first interface 1ST_I/F.

Moreover, when the controller 130 operates in the second operation mode, the second clock 2ND_CLK which is generated by the clock generation unit 135 and has a relatively low frequency may be transferred to the second interface control unit 1324. As a consequence, it is possible to decelerate relatively a speed at which data to be outputted/inputted from/to the nonvolatile memory device 150 and be transferred through the second interface control unit 1324 by the operation of the switching unit 133 are inputted/outputted to/from the host 102 through the second interface 2ND_I/F.

In other words, the operation selection unit 131, the clock generation unit 135 and the switching unit 133 operate such that a speed at which data to be outputted/inputted from/to the nonvolatile memory device 150 are transferred through the first interface 1ST_I/F may be higher than a speed at which data to be outputted/inputted from/to the nonvolatile memory device 150 are transferred through the second interface 2ND_I/F.

Summarizing these, in a period in which the first operation mode is entered, the controller 130 inputs/outputs data to be outputted/inputted from/to the nonvolatile memory device 150, to/from the host 102, through the first interface 1ST_I/F which operates in response to the first clock 1ST_CLK. Further, in a period in which the second operation mode is entered, the controller 130 inputs/outputs data to be outputted/inputted from/to the nonvolatile memory device 150, to/from the host 102, through the second interface 2ND_I/F which operates in response to the second clock 2ND_CLK.

The first operation mode is a mode that is entered when it is measured by the operation selection unit 131 that the durability of the nonvolatile memory device 150 is relatively high, and the second operation mode is a mode that is entered when it is measured by the operation selection unit 131 that the durability of the nonvolatile memory device 150 is relatively low. Since the first clock 1ST_CLK is generated by the clock generation unit 135 to have a frequency higher than the second clock 2ND_CLK, a speed at which data to be outputted/inputted from/to the nonvolatile memory device 150 are transferred through the first interface 1ST_I/F is higher than a speed at which data to be outputted/inputted from/to the nonvolatile memory device 150 are transferred through the second interface 2ND_I/F.

Therefore, in the first operation mode in which it is measured that the durability of the nonvolatile memory device 150 is relatively high, the controller 130 may input/output data to be outputted/inputted from/to the nonvolatile memory device 150, to/from the host 102, at a relatively high speed. Also, in the second operation mode in which it is measured that the durability of the nonvolatile memory device 150 is relatively low, the controller 130 may input/output data to be outputted/inputted from/to the nonvolatile memory device 150, to/from the host 102, at a relatively low speed.

As aforementioned, the first interface 1ST_I/F plays the role of transferring data at a higher speed than the second interface 2ND_I/F. Thus, in the present embodiment of the disclosure, the first interface 1ST_I/F may be assumed as a dual in-line memory module (DIMM) interface, and the second interface 2ND_I/F may be assumed as a PCI-Express (peripheral component interconnect express: PCI-e) interface.

When referring to such assumptions, in the first operation mode, the controller 130 may cause the nonvolatile memory device 150 to operate as the main memory device of the host 102, that is, a main memory of which role is performed generally by a DRAM memory in the conventional art. Also, in the second operation mode, the controller 130 may cause the nonvolatile memory device 150 to operate as the storage of the host 102, that is, a storage device of which role is performed generally by a NAND flash memory in the conventional art.

Figure 6:
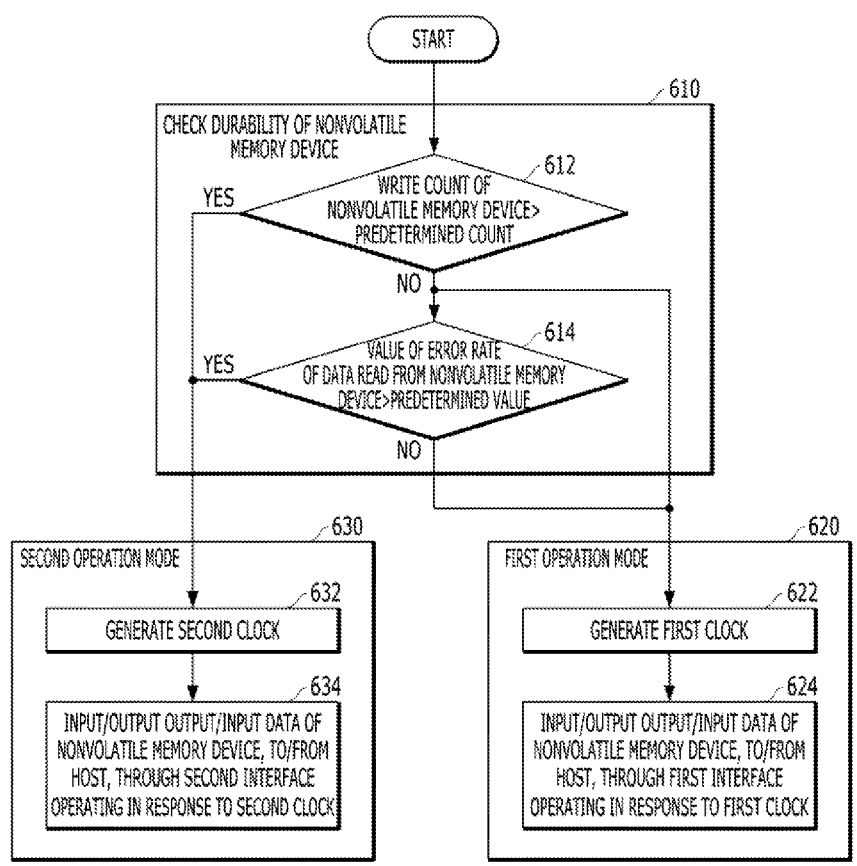
FIG. 6 is a flow chart to assist in the explanation of the operation of the memory system including characterizing features in accordance with the embodiment shown in FIG. 5.

FIG. 6 is a flow chart to assist in the explanation of the operation of the memory system including the characterizing features in accordance with the embodiment shown in FIG. 5.

Referring to FIG. 6, it may be seen that the operation of the memory system including characterizing features in accordance with the embodiment illustrated in FIG. 5 may be divided into three operations including an operation S610 of checking the durability of the nonvolatile memory device 150, a first operation mode operation S620 and a second operation mode operation S630.

First, the operation S610 of checking the durability of the nonvolatile memory device 150, includes an operation S612 of checking whether a count obtained by counting the write operations of the nonvolatile memory device 150 has a value larger than the predetermined count and an operation S614 of checking whether the error rate of the data read from the nonvolatile memory device 150 has a value larger than the predetermined value.

As a result of the operation S612 of checking whether a count obtained by counting the write operations of the nonvolatile memory device 150 has a value larger than the predetermined count, in the case where it is checked that a count obtained by counting the write operations of the nonvolatile memory device 150 has a value smaller (or equal to) than the predetermined count (NO), the first operation mode operation S620 is performed.

As a result of the operation S612 of checking whether a count obtained by counting the write operations of the nonvolatile memory device 150 has a value larger than the predetermined count, in the case where it is checked that a count obtained by counting the write operations of the nonvolatile memory device 150 has a value larger than the predetermined count (YES), the second operation mode operation S630 is performed.

Moreover, as a result of the operation S614 of checking whether the error rate of the data read from the nonvolatile memory device 150 has a value larger than the predetermined value, in the case where it is checked that the error rate of the data read from the nonvolatile memory device 150 has a value smaller than (or equal to) the predetermined value (NO), the first operation mode operation S620 is performed.

As a result of the operation S614 of checking whether the error rate of the data read from the nonvolatile memory device 150 has a value larger than the predetermined value, in the case where it is checked that the error rate of the data read from the nonvolatile memory device 150 has a value larger than the predetermined value (YES), the second operation mode operation S630 is performed.

For reference, while the flow chart is depicted in such a type that, after checking the result of the operation S612 of checking whether a count obtained by counting the write operations of the nonvolatile memory device 150 has a value larger than the predetermined count, the result of the operation S614 of checking whether the error rate of the data read from the nonvolatile memory device 150 has a value larger than the predetermined value is checked, this is nothing but a mere example, and it is to be noted that, actually, the two operations S612 and S614 may be reversed in their sequence or may be performed completely in parallel.

Describing the first operation mode operation S620, there are included an operation S622 of generating the first clock 1ST_CLK and an operation S624 of inputting and/or outputting data to be outputted/inputted from/to the nonvolatile memory device 150, to/from the host 102, through the first interface 1ST_I/F which operates in response to the first clock 1ST_CLK.

Describing the second operation mode operation S630, there are included an operation S632 of generating the second clock 2ND_CLK and an operation S634 of inputting and/or outputting data to be outputted/inputted from/to the nonvolatile memory device 150, to/from the host 102, through the second interface 2ND_I/F which operates in response to the second clock 2ND_CLK.

As is apparent from the above descriptions, when the embodiment of the present disclosure is applied, as the durability of the nonvolatile memory device 150 included in the memory system 110 varies, it is possible to change an Interface through which data to be outputted/inputted from/to the nonvolatile memory device 150 are transferred to/from the host 102.

Hence, the use of the nonvolatile memory device 150 included in the memory system 110 may be changed, whereby the lifetime of the nonvolatile memory device 150 may be lengthened and the uses of the memory system 110 including the nonvolatile memory device 150 may be extended.

Hereinbelow, descriptions will be made with reference to FIGS. 7 to 12, for a data processing system and electronic appliances to which the memory system 110 including the memory device 150 and the controller 130 described above with reference to FIGS. 1 to 6, according to the embodiment, is applied.

Figure 7:
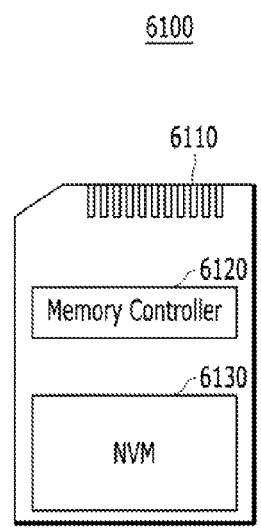
FIGS. 7 to 12 are diagrams illustrating various memory systems, according to exemplary embodiments of the present invention.

FIG. 7 is a diagram illustrating a data processing system including the memory system according to the embodiment. FIG. 7 is a drawing illustrating a memory card system 6100 to which the memory system according to an embodiment is applied.

Referring to FIG. 7, a memory card system 6100 may include a memory controller 6120, a memory device 6130, and a connector 6110.

The memory controller 6120 may be connected with the memory device 6130 and may access the memory device 6130. In some embodiments, the memory device 6130 may be implemented with a nonvolatile memory (NVM). For example, the memory controller 6120 may control read, write, erase and background operations for the memory device 6130. The memory controller 6120 may provide an interface between the memory device 6130 and a host (not shown), and may drive a firmware for controlling the memory device 6130. For example, the memory controller 6120 may correspond to the controller 130 in the memory system 110 described above with reference to FIG. 1, and the memory device 6130 may correspond to the memory device 150 in the memory system 110 described above with reference to FIG. 1.

Therefore, the memory controller 6120 may include components such as a random-access memory (RAM), a processing unit, a host interface, a memory interface and an error correction unit as shown in FIG. 1.

The memory controller 6120 may communicate with an external device (for example, the host 102 described above with reference to FIG. 1), through the connector 6110. For example, as described above with reference to FIG. 1, the memory controller 6120 may be configured to communicate with the external device through at least one of various communication protocols such as universal serial bus (USB), multimedia card (MMC), embedded MMC (eMMC), peripheral component interconnection (PCI), PCI express (PCIe), Advanced Technology Attachment (ATA), Serial-ATA, Parallel-ATA, small computer system interface (SCSI), enhanced small disk interface (ESDI), Integrated Drive Electronics (IDE), Firewire, universal flash storage (UFS), wireless-fidelity (WI-FI) and Bluetooth. Accordingly, the memory system and the data processing system according to the embodiment may be applied to wired/wireless electronic appliances, for example, a mobile electronic appliance.

The memory device 6130 may be implemented with a nonvolatile memory (NVM). For example, the memory device 6130 may be implemented with various nonvolatile memory devices such as an electrically erasable and programmable ROM (EEPROM), a NAND flash memory, a NOR flash memory, a phase-change RAM (PRAM), a resistive RAM (RRAM), a ferroelectric RAM (FRAM), a magnetoresistive RAM (MRAM) and a spin torque transfer magnetic RAM (STT-MRAM).

The memory controller 6120 and the memory device 6130 may be integrated into a single semiconductor device. For example, the memory controller 6120 and the memory device 6130 may construct a solid-state driver (SSD) by being integrated into a single semiconductor device. The memory controller 6120 and the memory device 6130 may construct a memory card such as a PC card (Personal Computer Memory Card International Association; PCM-CIA), a compact flash card (CF), a smart media card (SM and SMC), a memory stick, a multimedia card (MMC, RS-MMC, MMCmicro and eMMC), an SD card (e.g., SD, miniSD, microSD and SDHC) and a universal flash storage (UFS).

Figure 8:
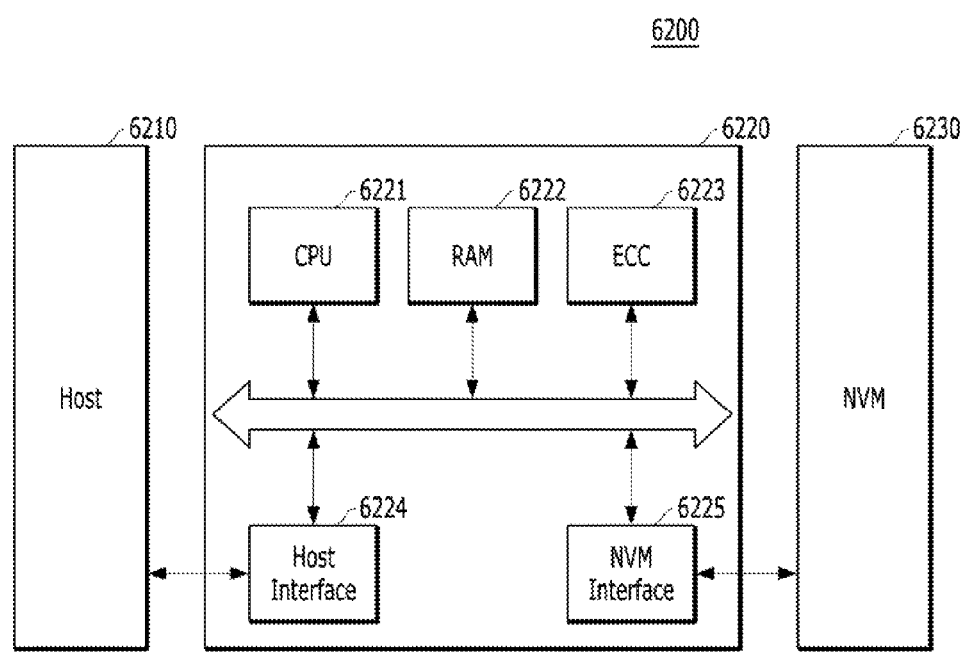

FIG. 8 is a diagram illustrating an example of a data processing system 6200 including a memory system according to an exemplary embodiment of the present invention.

Referring to FIG. 8, a data processing system 6200 may include a memory device 6230 which may be implemented with at least one nonvolatile memory (NVM) and a memory controller 6220 for controlling the memory device 6230. The data processing system 6200 may be a storage medium such as a memory card (e.g., CF, SD and microSD), as described above with reference to FIG. 1. The memory device 6230 may correspond to the memory device 150 in the memory system 110 described above with reference to FIG. 1, and the memory controller 6220 may correspond to the controller 130 in the memory system 110 described above with reference to FIG. 1.

The memory controller 6220 may control the operations, including the read, write and erase operations for the memory device 6230 in response to requests received from a host 6210. The memory controller 6220 may include a central processing unit (CPU) 6221, a random-access memory (RAM) as a buffer memory 6222, an error correction code (ECC) circuit 6223, a host interface 6224, and an NVM interface as a memory interface 6225, all coupled via an internal bus.

The CPU 6221 may control the operations for the memory device 6230 such as read, write, file system management, bad page management, and so forth. The RAM 6222 may operate according to control of the CPU 6221, and may be used as a work memory, a buffer memory, a cache memory, or the like. In the case where the RAM 6222 is used as a work memory, data processed by the CPU 6221 may be temporarily stored in the RAM 6222. In the case where the RAM 6222 is used as a buffer memory, the RAM 6222 may be used to buffer data to be transmitted from the host 6210 to the memory device 6230 or from the memory device 6230 to the host 6210. In the case where the RAM 6222 is used as a cache memory, the RAM 6222 may be used to enable the memory device 6230 with a low speed to operate at a high speed.

The ECC circuit 6223 may correspond to the ECC unit 138 of the controller 130 described above with reference to FIG. 1. As described above with reference to FIG. 1, the ECC circuit 6223 may generate an error correction code (ECC) for correcting a fail bit or an error bit in the data received from the memory device 6230. The ECC circuit 6223 may perform error correction encoding for data to be provided to the memory device 6230, and may generate data added with parity bits. The parity bits may be stored in the memory device 6230. The ECC circuit 6223 may perform error correction decoding for data outputted from the memory device 6230. At this time, the ECC circuit 6223 may correct errors by using the parity bits. For example, as described above with reference to FIG. 1, the ECC circuit 6223 may correct errors by using various coded modulations such as of a low-density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM) and a Block coded modulation (BCM).

The memory controller 6220 may transmit and receive data to and from the host 6210 through the host interface 6224, and transmit and receive data to and from the memory device 6230 through the NVM interface 6225. The host interface 6224 may be connected with the host 6210 through at least one of various Interface protocols such as a parallel advanced technology attachment (PATA) bus, a serial advanced technology attachment (SATA) bus, a small computer system interface (SCSI), a universal serial bus (USB), a peripheral component interconnection express (PCIe) or a NAND interface. Further, as a wireless communication function or a mobile communication protocol such as wireless fidelity (WI-FI) or long term evolution (LTE) is realized, the memory controller 6220 may transmit and receive data by being connected with an external device such as the host 6210 or another external device other than the host 6210. Specifically, as the memory controller 6220 is configured to communicate with an external device through at least one among various communication protocols, the memory system and the data processing system according to the embodiment may be applied to wired/wireless electronic appliances, for example, a mobile electronic appliance.

Figure 9:
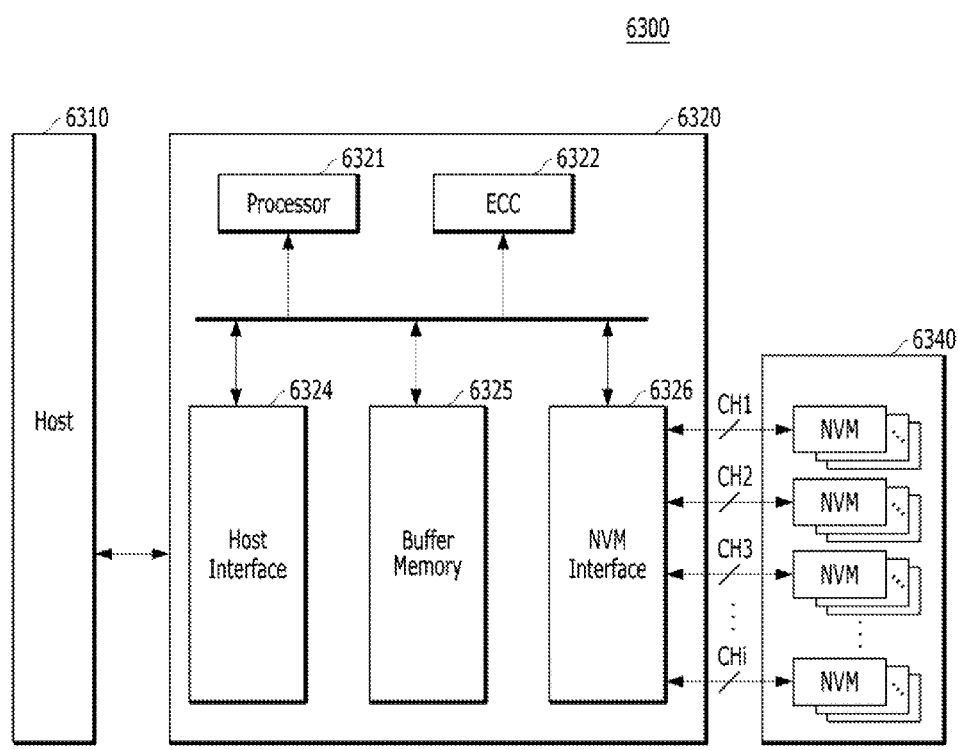

FIG. 9 is a diagram illustrating an example of a data processing system including a memory system according to an exemplary embodiment of the invention. FIG. 9 may be a solid state drive (SSD) 6300.

Referring to FIG. 9, an SSD 6300 may include a memory device 6340 which may include a plurality of nonvolatile memories NVM, and a controller 6320. The controller 6320 may correspond to the controller 130 in the memory system 110 described above with reference to FIG. 1, and the memory device 6340 may correspond to the memory device 150 in the memory system 110 described above with reference to FIG. 1.

The controller 6320 may be connected with the memory device 6340 through a plurality of channels CH1, CH2, CH3, . . . and CHi. The controller 6320 may include a processor 6321, a buffer memory 6325, an error correction code (ECC) circuit 6322, a host interface 6324, and a nonvolatile memory (NVM) interface as a memory interface 6326 coupled via an internal bus.

The buffer memory 6325 may temporarily store data received from a host 6310 or data received from a plurality of nonvolatile memories NVMs included in the memory device 6340, or temporarily store metadata of the plurality of nonvolatile memories NVMs. For example, the metadata may include map data including mapping tables. The buffer memory 6325 may be implemented with a volatile memory such as, but not limited to, a dynamic random access memory (DRAM), a synchronous dynamic random access memory (SDRAM), a double data rate (DDR) SDRAM, a low power double data rate (LPDDR) SDRAM and a graphic random access memory (GRAM) or a nonvolatile memory such as, but not limited to, a ferroelectric random access memory (FRAM), a resistive random access memory (RRAM), a magnetoresistive RAM (MRAM), a spin-transfer torque magnetic random access memory (STT-MRAM) and a phase-change random access memory (PRAM). While it is illustrated in FIG. 9, for the sake of convenience in explanation, that the buffer memory 6325 is disposed inside the controller 6320, it is to be noted that the buffer memory 6325 may be disposed outside the controller 6320.

The ECC circuit 6322 may calculate error correction code values of data to be programmed in the memory device 6340 in a program operation, perform an error correction operation for data read from the memory device 6340, based on the error correction code values, in a read operation, and perform an error correction operation for data recovered from the memory device 6340 in a recovery operation for failed data.

The host interface 6324 may provide an interface function with respect to an external device such as the host 6310. The nonvolatile memory interface 6326 may provide an interface function with respect to the memory device 6340 which is connected through the plurality of channels CH1, CH2, CH3, . . . and CHi.

As a plurality of SSDs 6300 to each of which the memory system 110 described above with reference to FIG. 1 is applied are used, a data processing system such as a redundant array of independent disks (RAID) system may be implemented. In the RAID system, the plurality of SSDs 6300 and an RAID controller for controlling the plurality of SSDs 6300 may be included. In the case of performing a program operation by receiving a write command from the host 6310, the RAID controller may select at least one memory system (for example, at least one SSD 6300) in response to the RAID level information of the write command received from the host 6310, among a plurality of RAID levels (for example, the plurality of SSDs 6300) and may output data corresponding to the write command, to the selected SSD 6300. In the case of performing a read operation by receiving a read command from the host 6310, the RAID controller may select at least one memory system (for example, at least one SSD 6300) in response to the RAID level information of the write command received from the host 6310, among the plurality of RAID levels (for example, the plurality of SSDs 6300), and may provide data outputted from the selected SSD 6300, to the host 6310.

Figure 10:
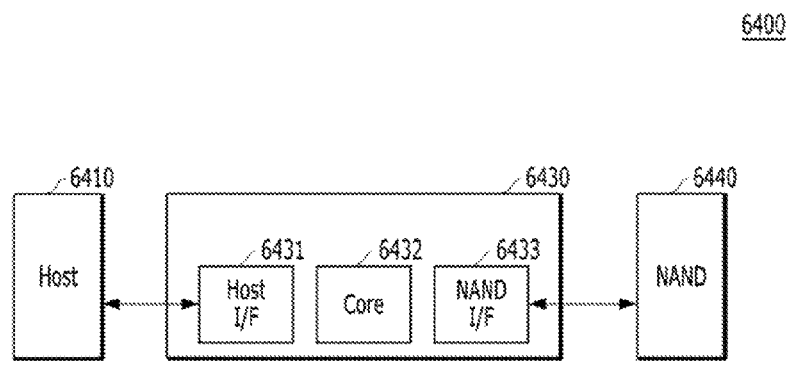

FIG. 10 is a diagram illustrating another example of a data processing system including the memory system according to an exemplary embodiment of the present invention. FIG. 10 is a drawing illustrating an embedded multimedia card (eMMC) 6400 to which a memory system according to an embodiment is applied.

Referring to FIG. 10, an eMMC 6400 may include a memory device 6440 which is implemented with at least one NAND flash memory, and a controller 6430. The controller 6430 may correspond to the controller 130 in the memory system 110 described above with reference to FIG. 1, and the memory device 6440 may correspond to the memory device 150 in the memory system 110 described above with reference to FIG. 1.

The controller 6430 may be connected with the memory device 6440 through a plurality of channels. The controller 6430 may include a core 6432, a host Interface 6431, and a memory interface such as a NAND interface 6433.

The core 6432 may control the operations of the eMMC 6400. The host interface 6431 may provide an interface function between the controller 6430 and a host 6410. The NAND interface 6433 may provide an interface function between the memory device 6440 and the controller 6430. For example, the host interface 6431 may be a parallel interface such as an MMC interface, as described above with reference to FIG. 1, or a serial interface such as an ultra-high speed class 1 (UHS-I)/UHS class 2 (UHS-II) and a universal flash storage (UFS) interface.

Figure 11:
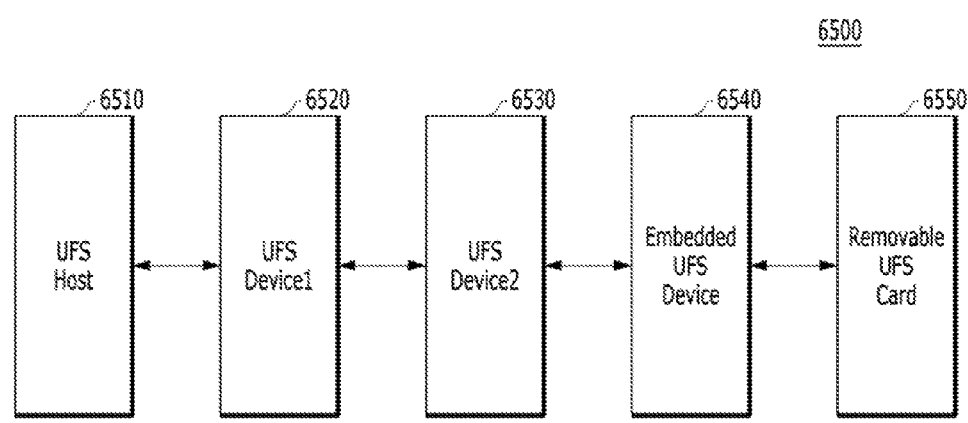

FIG. 11 is a diagram illustrating another example of a data processing system including a memory system according to an exemplary embodiment of the present invention. FIG. 11 is a drawing illustrating a universal flash storage (UFS) system 6500 to which the memory system according to the embodiment is applied.

Referring to FIG. 11, a UFS system 6500 may include a UFS host 6510, a plurality of UFS devices 6520 and 6530, an embedded UFS device 6540, and a removable UFS card 6550. The UFS host 6510 may be an application processor of wired/wireless electronic appliances, for example, a mobile electronic appliance.

The UFS host 6510, the UFS devices 6520 and 6530, the embedded UFS device 6540 and the removable UFS card 6550 may respectively communicate with external devices such as wired/wireless electronic appliances (for example, a mobile electronic appliance), through a UFS protocol. The UFS devices 6520 and 6530, the embedded UFS device 6540 and the removable UFS card 6550 may be implemented with the memory system 110 described above with reference to FIG. 1, for example, as the memory card system 6100 described above with reference to FIG. 7. The embedded UFS device 6540 and the removable UFS card 6550 may communicate through another protocol other than the UFS protocol. For example, the embedded UFS device 6540 and the removable UFS card 6550 may communicate through various card protocols such as, but not limited to, USB flash drives (UFDs), multimedia card (MMC), secure digital (SD), mini SD and Micro SD.

Figure 12:
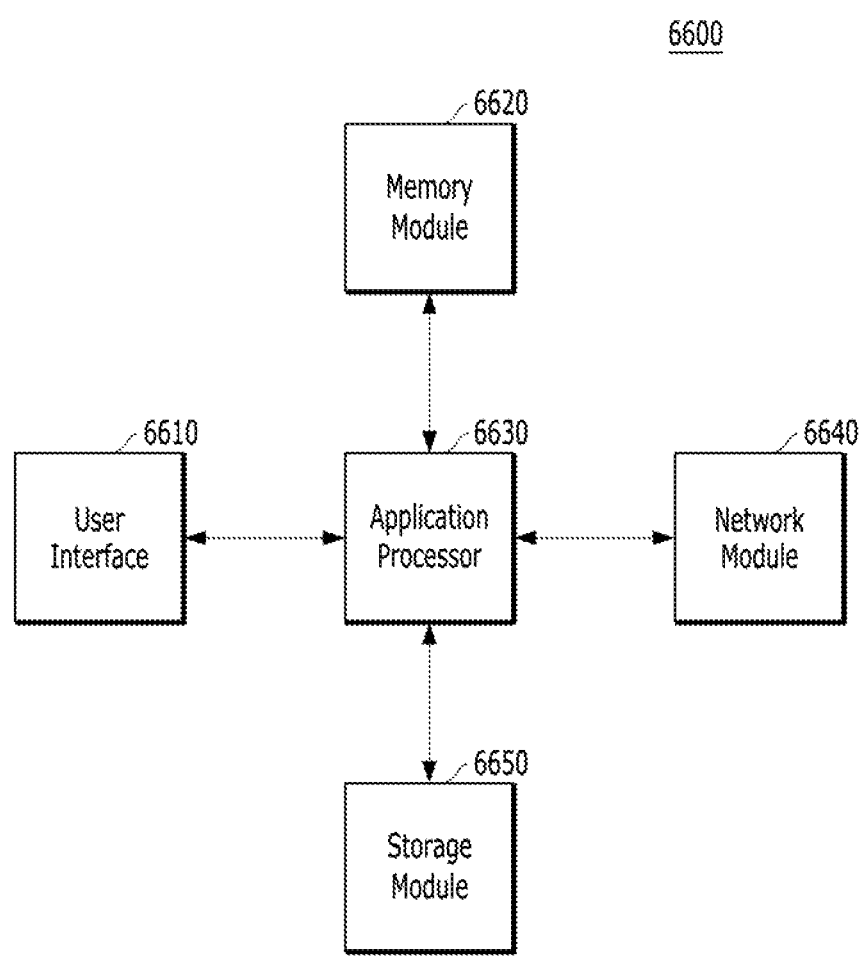

FIG. 12 is a diagram illustrating an example of a data processing system including the memory system according to an exemplary embodiment of the present invention. FIG. 12 is a drawing illustrating a user system 6600 to which the memory system according to the embodiment is applied.

Referring to FIG. 12, a user system 6600 may include an application processor 6630, a memory module 6620, a network module 6640, a storage module 6650, and a user Interface 6610.

The application processor 6630 may drive components included in the user system 6600 and an operating system (OS). For example, the application processor 6630 may include controllers for controlling the components included in the user system 6600, interfaces, graphics engines, and so on. The application processor 6630 may be provided by a system-on-chip (SoC).

The memory module 6620 may operate as a main memory, a working memory, a buffer memory or a cache memory of the user system 6600. The memory module 6620 may include a volatile random access memory such as a dynamic random access memory (DRAM), a synchronous dynamic random access memory (SDRAM), a double data rate (DDR) SDRAM, a DDR2 SDRAM, a DDR3 SDRAM, a low power double data rate (LPDDR) SDRAM, an LPDDR2 SDRAM and an LPDDR3 SDRAM or a nonvolatile random access memory such as a phase-change random access memory (PRAM), a resistive random access memory (ReRAM), a magnetoresistive RAM (MRAM), a spin transfer torque random access memory (STT-RAM) and a ferroelectric random access memory (FRAM). For example, the application processor 6630 and the memory module 6620 may be mounted by being packaged on the basis of a package-on-package (POP).

The network module 6640 may communicate with external devices. For example, the network module 6640 may support not only wired communications but also various wireless communications such as code division multiple access (CDMA), global system for mobile communication (GSM), wideband CDMA (WCDMA), CDMA-2000, time division multiple access (TDMA), long term evolution (LTE), worldwide interoperability for microwave access (WIMAX), wireless local area network (WLAN), ultra-wideband (UWB), Bluetooth, wireless display (WI-DI), and so on, and may thereby communicate with wired/wireless electronic appliances, for example, a mobile electronic appliance. According to this fact, the memory system and the data processing system according to the embodiment may be applied to wired/wireless electronic appliances. The network module 6640 may be included in the application processor 6630.

The storage module 6650 may store data such as data received from the application processor 6530, and transmit data stored therein, to the application processor 6530. The storage module 6650 may be realized by a nonvolatile semiconductor memory device such as a phase-change RAM (PRAM), a magnetoresistive RAM (MRAM), a spin transfer torque random access memory (STT-RAM), a resistive RAM (ReRAM), a NAND flash memory, a NOR flash memory and a 3-dimensional NAND flash memory. The storage module 6650 may be provided as a removable storage medium such as a memory card of the user system 6600 and an external drive. For example, the storage module 6650 may correspond to the memory system 110 described above with reference to FIG. 1, and may be implemented with the SSD, eMMC and UFS described above with reference to FIGS. 9 to 11.

The user interface 6610 may include Interfaces suitable for inputting data or commands to the application processor 6630 or for outputting data to an external device. For example, the user interface 6610 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, a light emitting diode (LED), a speaker and a motor.

In the case where the memory system 110 described above with reference to FIG. 1 is applied to the mobile electronic appliance of the user system 6600 according to an embodiment, the application processor 6630 may control the operations of the mobile electronic appliance, and the network module 6640 as a communication module may control wired/wireless communication with an external device, as described above. The user interface 6610 as the display/touch module of the mobile electronic appliance displays data processed by the application processor 6630 or supports input of data from a touch panel.

The present technology includes two different interfaces suitable for inputting and/or outputting data to be outputted/inputted from/to a nonvolatile memory device, to/from a host, and may use the nonvolatile memory device by changing the use thereof through changing an interface to be used, depending on a variation in the durability of the nonvolatile memory device.

Through this, the lifetime of the nonvolatile memory device may be lengthened, and the uses thereof may be extended.

Although various embodiments have been described for illustrative purposes, it will be apparent to those skilled in the art that various changes and modifications may be made without departing from the spirit and scope of the invention as defined in the following claims.

What is claimed is:

1. A memory system comprising:
    a nonvolatile memory device; and
    a controller operatively coupled to the nonvolatile memory device and to a host, the controller including first and second interfaces suitable for inputting and/or outputting data from or to the host, wherein the controller is suitable for selecting any one of the first and second interfaces depending on a result of a durability check of the nonvolatile memory device.

2. The memory system according to claim 1, wherein the controller comprises:
    an operation selection unit suitable for performing the durability check of the nonvolatile memory device, and for selecting entry to a first or a second operation mode depending on the result of the durability check; and
    a switching unit suitable for inputting and/or outputting data of the nonvolatile memory device to/from the host through the first interface in the first operation mode, and inputting and/or outputting data of the nonvolatile memory device to/from the host through the second interface in the second operation mode.

3. The memory system according to claim 2, wherein the operation selection unit counts a write operation count of the nonvolatile memory device and selects entry to the first or the second operation mode, based on a predetermined count.

4. The memory system according to claim 2, wherein the operation selection unit checks a value of an error rate of data read and outputted from the nonvolatile memory device and selects entry to the first or the second operation mode, based on a predetermined value.

5. The memory system according to claim 2, wherein the operation selection unit enters the first operation mode in the case where the durability check result is larger than a predetermined reference, and enters the second operation mode in the case where the durability check result is smaller than the predetermined reference.

6. The memory system according to claim 5, wherein the controller further comprises:
    a clock generation unit suitable for generating a first clock of a relatively high frequency in the first operation mode and generating a second clock of a relatively low frequency in the second operation mode.

7. The memory system according to claim 6, wherein the controller inputs/outputs output/input data of the nonvolatile memory device to/from the host through the first interface which operates in response to the first clock in a period in which the first operation mode is entered, and inputs/outputs output/input data of the nonvolatile memory device to/from the host through the second interface which operates in response to the second clock in a period in which the second operation mode is entered.

8. The memory system according to claim 7,
    wherein the controller uses the nonvolatile memory device as a main memory device of the host, in the first operation mode, and
    wherein the controller uses the nonvolatile memory device as a storage of the host, in the second operation mode.

9. The memory system according to claim 8,
    wherein the first interface is a dual in-line memory module (DIMM) interface, and
    wherein the second interface is a PCI-express (peripheral component interconnect express: PCI-e) interface.

10. The memory system according to claim 9, wherein the nonvolatile memory device is at least one of a flash memory, a phase-change random access memory (PCRAM), a resistive random access memory (RRAM), a ferroelectric random access memory (FRAM), a magnetoresistive RAM (MRAM) and a spin transfer torque random access memory (STT-RAM).

11. A method for operating a memory system comprising a nonvolatile memory device coupled first and second interfaces suitable for inputting and/or outputting data from or to a host, the method comprising:
    performing a durability check of the nonvolatile memory device; and
    inputting and/or outputting data of the nonvolatile memory device to/from the host by selecting one of the first and second interfaces depending on a result of the durability check.

12. The method according to claim 11,
    wherein the durability check comprises:
    measuring durability of the nonvolatile memory device, and selecting entry to a first or a second operation mode depending on the measurement result, and
    wherein the inputting and/or outputting comprises:
    inputting and/or outputting data of the nonvolatile memory device to/from the host through the first interface in the first operation mode; and
    inputting and/or outputting data of the nonvolatile memory device to/from the host through the second interface in the second operation mode.

13. The method according to claim 12, wherein the durability check includes counting a write operation count of the nonvolatile memory device and selecting entry to the first or the second operation mode based on a predetermined count.

14. The method according to claim 12, wherein the durability check includes checking a value of an error rate of data read and outputted from the nonvolatile memory device and selecting entry to the first or the second operation mode based on a predetermined value.

15. The method according to claim 12, wherein the durability check comprises:
    entering the first operation mode in the case where the durability check result is larger than a predetermined reference; and
    entering the second operation mode in the case where the durability check result is smaller than the predetermined reference.

16. The method according to claim 15, further comprising:
generating a first clock of a relatively high frequency in the first operation mode, and generating a second clock of a relatively low frequency in the second operation mode.

17. The method according to claim 16, wherein the inputting and/or outputting comprises:
inputting and/or outputting data of the nonvolatile memory device to/from the host through the first interface which operates in response to the first clock in a period in which the first operation mode is entered; and
inputting and/or outputting data of the nonvolatile memory device to/from the host through the second interface which operates in response to the second clock in a period in which the second operation mode is entered.

18. The method according to claim 17,
wherein the nonvolatile memory device is used as a main memory device of the host, in the first operation mode, and
wherein the nonvolatile memory device is used as a storage of the host, in the second operation mode.

19. The method according to claim 18,
wherein the first interface is a dual in-line memory module (DIMM) interface, and
wherein the second interface is a PCI-express (peripheral component interconnect express: PCI-e) interface.

20. The method according to claim 19, wherein the nonvolatile memory device is at least one of a flash memory, a phase-change random access memory (PCRAM), a resistive random access memory (RRAM), a ferroelectric random access memory (FRAM), a magnetoresistive RAM (MRAM) and a spin transfer torque random access memory (STT-RAM).

* * * * *